United States Patent [19]

Steele et al.

[11] Patent Number: 5,102,214
[45] Date of Patent: Apr. 7, 1992

[54] INTERFEROMETER ALIGNMENT CONTROL APPARATUS

[75] Inventors: Kenneth L. Steele, Santa Ana; Thomas M. Wirt, Irvine; Francis M. Erdmann, Anaheim; Frederick Vescial, Orange; William T. Schmars, Fullerton; Frederick Aronowitz, Laguna Niguel, all of Calif.

[73] Assignee: Rockwell International Corporation, El Segundo, Calif.

[21] Appl. No.: 456,997

[22] Filed: Dec. 26, 1989

[51] Int. Cl.$^5$ ............................................... G02B 26/02
[52] U.S. Cl. .................................. 359/223; 250/201.9; 359/847
[58] Field of Search .................................. 350/486–487, 350/96.15, 632, 6.1, 6.2, 6.6, 607–608; 356/351–352, 360; 250/201.9

[56] References Cited

U.S. PATENT DOCUMENTS

| | | | |
|---|---|---|---|
| 4,340,304 | 7/1982 | Massie | 356/351 |
| 4,444,501 | 4/1984 | Schwiesow | 356/346 |
| 4,572,669 | 2/1986 | James et al. | 356/352 |
| 4,711,573 | 12/1987 | Wijntjes et al. | 356/346 |
| 4,954,700 | 9/1990 | Trozpek | 350/608 |

Primary Examiner—Bruce Y. Arnold
Assistant Examiner—James Phan
Attorney, Agent, or Firm—H. Fredrick Hamann; George A. Montanye; Tom Streeter

[57] ABSTRACT

An alignment and path length control apparatus having a mirror housing having a base and a closed wall. The base has a mirrored external surface. The closed wall has a central axis. The closed wall is joined to the base at a base end of the closed wall by a flexible web. The closed wall extends above the base and terminates at a rim defining an aperture. The base has a central region coupled to the cylindrical wall. A post extends from the central region of the base within the cylindrical wall to a top end. A mirror axis extends from the mirrored external surface through the post. The central axis is substantially parallel to the mirror axis. An alignment transducer responds to a first alignment control signal by applying at least a first force between the post and the wall to deflect the mirror axis with respect to the central axis. A linear transducer responds to a linear displacement control signal by applying an axial force to the post to displace the central region longitudinally along the central axis.

16 Claims, 8 Drawing Sheets

FIG. 11    PZT TRANSDUCER    DIAPHRAGM MIRROR

FIG. 12    PZT TRANSDUCER    DIAPHRAGM MIRROR

INTERFEROMETER ALIGNMENT CONTROL APPARATUS

BACKGROUND OF THE INVENTION

1. Field of the Invention

This invention relates to the field of laser and optical instruments and more particularly to the field of interferometric systems that require a control to peak the response of a laser signal source such as the signal output from an active linear or ring laser gyro, or the mode of fequency dithering of a passive interferometer.

2. Prior Art

Interferometric control assemblies typically have a frame or body, on which a multi-layer dielectric mirror is centrally formed, with a flat mounting surface. The flat surface is typically bonded to an end or corner of an optical cavity in an interferometer, or laser, or ring laser gyro body. The mirrors are used to reflect light passing through the cavity incident on the mirrored surface. The mirrored surface is typicallly formed on a thin wall that serves as a diaphragm to permit slight motion of the mirrored surface as part of the cavity. A PZT (piezoelectric transducer), that is attached to the diaphragm, is driven with an electrical control signal to move the diaphragm to thereby shorten or lengthen the optical pathlength to optimize the resonance of the cavity.

The path length control provided by conventional control assemblies makes no provision for correcting small reflective angle misalignment caused by inherent fabrication misalignment in the cavity and by bending effects in the laser cavity or diaphragm mirror. Mirror alignment is made costly during the fabrication of the interferometer because provision is not usully made for correcting the interferometer alignment dynamically during operation.

SUMMARY OF THE INVENTION

The invention alignment control apparatus has an extendable external surface on one of a mirror housing and a linear transducer assembly at the opposing end of the housing.

The extendable external surface has a flat perimeter that is contacted to the body of the interferometer housing to position a multilayer dielectric mirror formed on the extendable external surface of the mirror housing at a point of reflection within the interferometer. The mirrored surface is perpendicular to the central axis of the mirror housing, and the laser optical beam impinging upon, or generated internally in the interferometric cavity, is indicent on the mirrored surface.

It is an object of this invention to provide an apparatus that will simultaneously provide a pathlength control and a control means for rotating a mirror surface formed on the extendable external surface of the base of a diaphragm mirror housing. The surface of the mirror is positioned and aligned based on a contol strategy, and its surface is usually normal to the path length control axis. The rotation of the mirror surface takes place on one or more axes usually normal to the path length control axis. The mirror rotates in response to independent control signals applied to quadrant specific rotation control PZT devices.

Another object of this invention is the use of the stiffening back plate for controlling the alignment of the mirror surface while not influencing the path length control.

The link pin in the present invention is in tension after installation. Another benefit of the arrangement shown is that the transducer is pulled down onto the top rim of the mirror housing and rests on an inner lip that is formed on the inner wall of the linear transducer. Early designs required that the linear transducer be bonded around the top rim of the mirror housing. As the adjustment screw was tightened, the post was placed in compression and the bonding material around the rim used to hold the linear transducer in place was placed in shear, adding another source of variation as a function of temperature. The present invention eleminates the previous problems associated with bonding the linear transducer to the mirror housing because the metal flange on the inner wall of the linear transducer is supported on the rim.

A transducer housing contains a path length control PZT for adjusting the pathlength deflection distance that the mirror is translated through, in the process of maintaining the control requirements of the interferometer.

For the simultaneous implementation of alignment and path length control, suitable apparatus is required. For this implementation, the mirror housing is shaped like a cup with a post extending from the central region of a base to a height equal to the height of the rim of the mirror housing. The central post has an axial hole. A rod is received in the hole and secured by a link pin that passes transverely through the post and the rod. The rod and link pin connect the extendable inner surface to a collar and adjusting screw which is used to preload the diaphragm or extendable inner surface. The transducer housing has a linear transducer assembly responsive to a linear displacement control signal for applying an axial force to the post with respect to the mirror housing to displace the central region of the mirror housing along the longitudinal axis of the mirror housing.

An alignment means responds to an alignment control signal, by applying a force between the post and the wall of the mirror housing to deflect the post with respect to the central axis of the mirror housing, thereby pivoting the external mirror suface.

BRIEF DESCRIPTION OF THE DRAWINGS

FIG. 7b is an enlarge section of FIG. 7a;

PREFERRED EMBODIMENT

Figure 1:
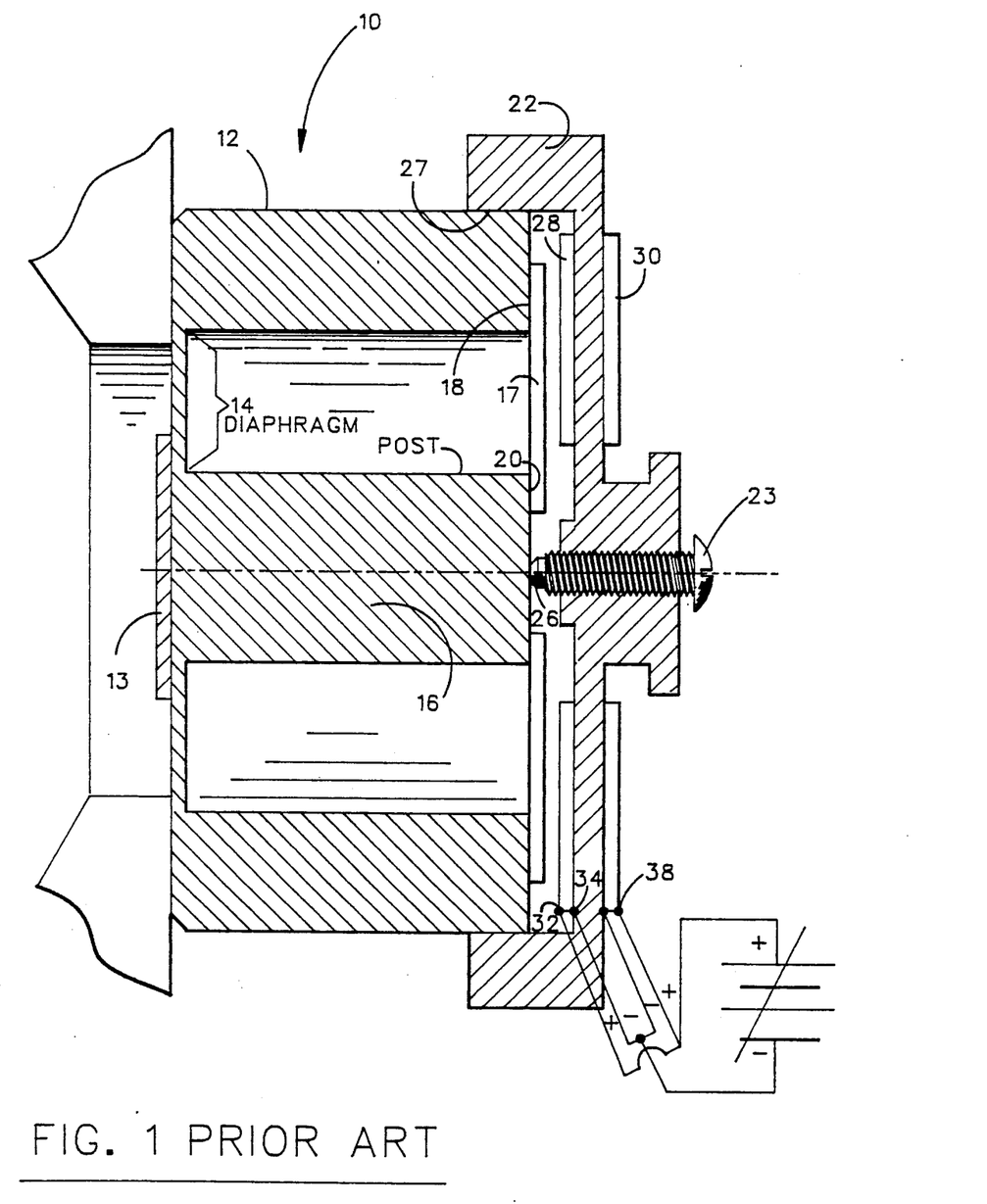
FIG. 1 is a sectional view of a prior art pathlength control apparatus.

FIG. 1 shows a conventional pathlength control apparatus (PLC) 10 in section. The housing 12 is typically formed from ZERODUR, a type of glass having a low thermal coefficient of expansion. The housing is shaped as a cylindrical cup having a base that functions as a first diaphragm 14. A multilayer dielectric coated mirror 13 is attached to the end of the housing. A cylindrical mirror post 16 extends vertically from the base 14. A glass washer 17 is bonded to the housing rim 18 and to the post top 20 to operate as a bridge support to the structure.

A metal cap 22 is bonded to the housing 12 at surface 27. The metal cap is tapped to receive screw 23. The screw has a rounded tip 26 to facilitate rotary motion of the rounded tip against the top of mirror post 16. The screw 23 is advanced into the threaded cap to apply a compressive force against the top of mirror post 16. The force applied is tranferred via cap 22 to the outer rim 27 of housing 12.

The displacement transducers such as piezoelectric transducer (PZT) 28 and 30 are washer shaped PZT devices that are typically formed from a material such as lead-zirconate titanate. Each PZT has metalized surfaces on opposite sides. Connections are made to the PZT metalized surfaces to cause one PZT to expand, as the other is driven to contract. The simultaneous expansion and contraction of the PZT drives causes the screw 23 to add to or substract from the preload applied to mirror post 16. The change in force applied to the mirror post causes the mirror post to move and thus moves mirror 13.

A conventional pathlength control apparatus is designed to lengthen or shorten the pathlength of an interferometric cavity in response to a complementary control signal applied to the PZT terminals 38, 32 with respect to terminal 34.

Figure 2:
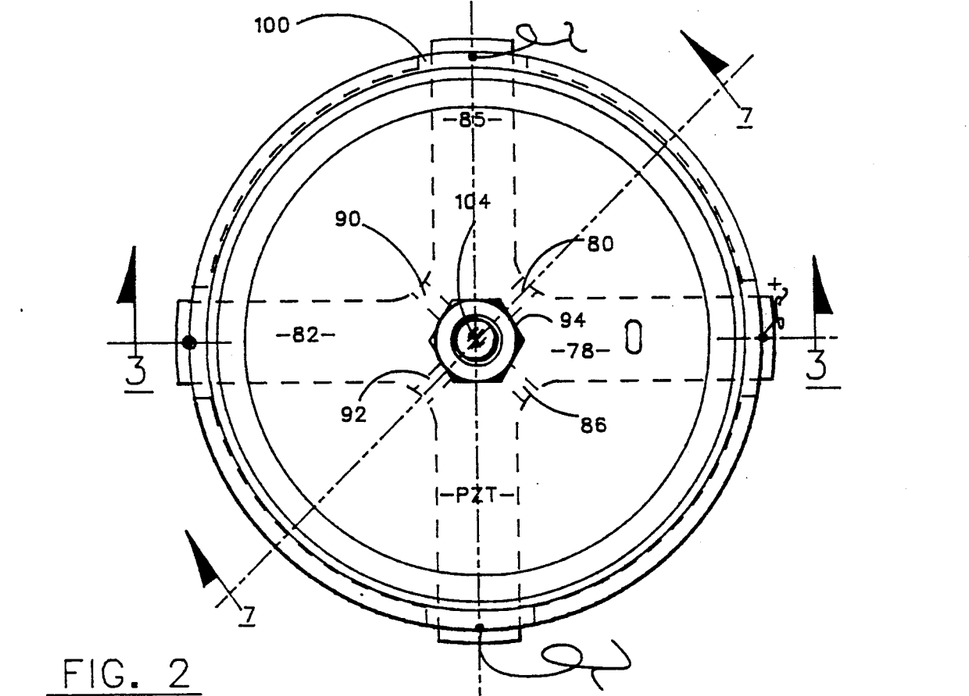
FIG. 2 is a top plan view of the alignment control apparatus with path length control.
Figure 3:
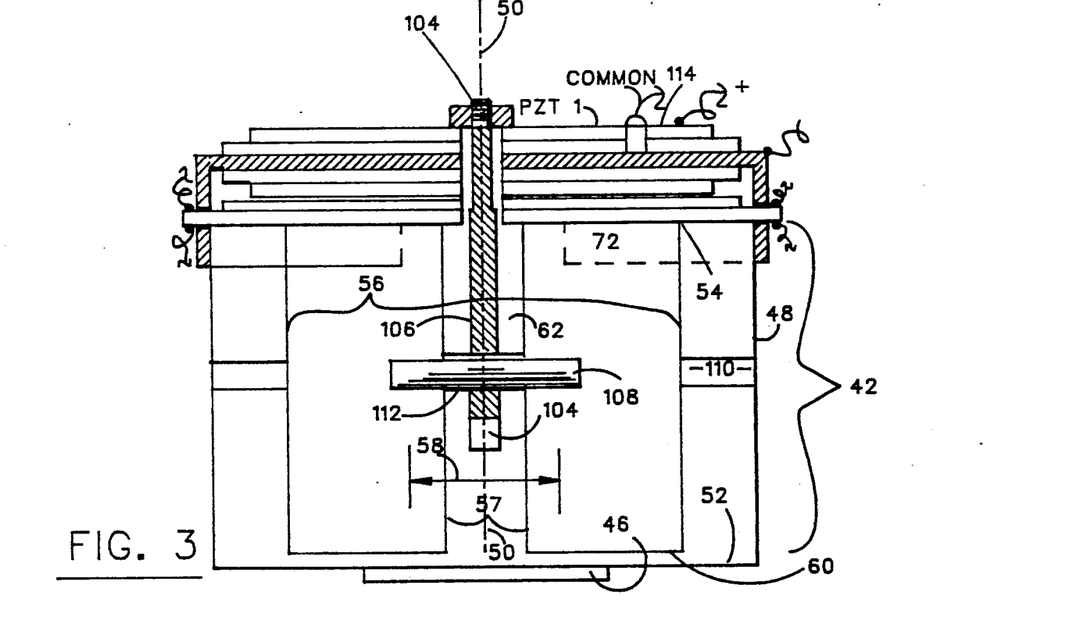
FIG. 3 is a sectional view taken on line 3—3 of FIG. 2 of the alignment control apparatus with path length control.

FIG. 3 is a sectional view of the interferometric alignment control with simultaneous pathlength control capability, the apparatus 40 taken on section line 3—3 of FIG. 2. FIG. 2 is a top view of the alignment control apparatus 40.

The alignment control apparatus 40 comprises a mirror housing 42 with a base 44. The base 44 has a mirrored external surface 46. The mirrored external surface is typically a multilayer dielectric surface having a high reflectivity for the bandwidth of the laser or other light source with which it is to be used.

Wall 48 is cylindrical in shape, preferably with a circular cross section, on central axis 50. The cylindrical shape is a design choice. It is clear that other shapes such as triangular, rectangular, hexagonal or elliptical would work as well. The cylindrical wall 48 is joined to the base 44 at base end 52. The wall extends above the base 44 and terminates at a rim 54, defining an interior dimension 56. The base has a diaphragm web 60 which connects the inside surface of cylindrical wall 48 to the central post 62. The base diaphragm web 60 is a flexible region that is centered on central axis 50 in the inner ZERODUR surface of base 44. The diaphragm web 60 of the diaphragm is typically 0.020–0.022 inches in thickness.

A mirror post 62 extends from the center area 58 of the base 44 within the cylindrical wall 48 to a top end 64. A mirror axis extends from the mirrored external surface centrally through the mirror psot 62. The central axis 50 is substantially parallel and conincident with the mirror axis.

Figure 4:
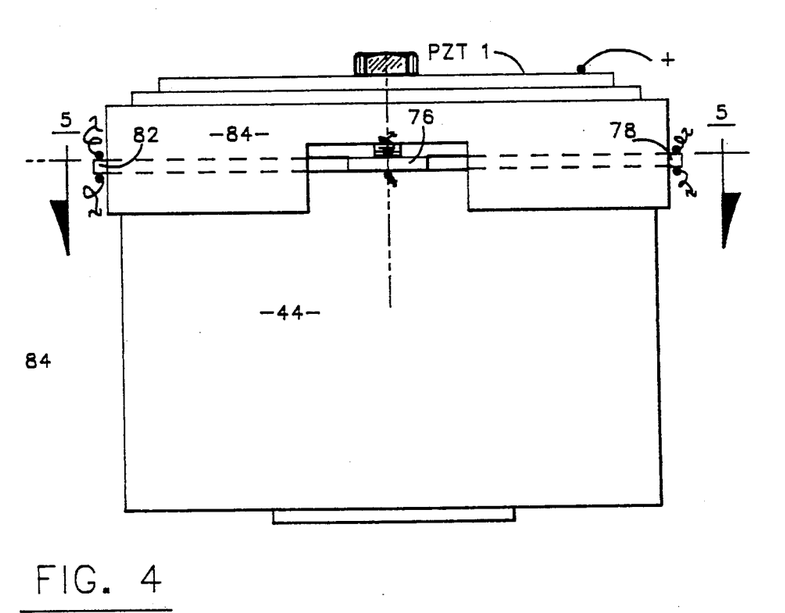
FIG. 4 is a side elevation view of the alignment control appparatus with path length control.

FIG. 4 is a side view of the path length control apparatus 40 depicting transducer housing 84 positioned on top of the mirror housing 42. In the preferred embodiment the transducer housing 84 is machined from Titanium. Stainless steel is also acceptable where weight is not a factor of concern.

Figure 5:
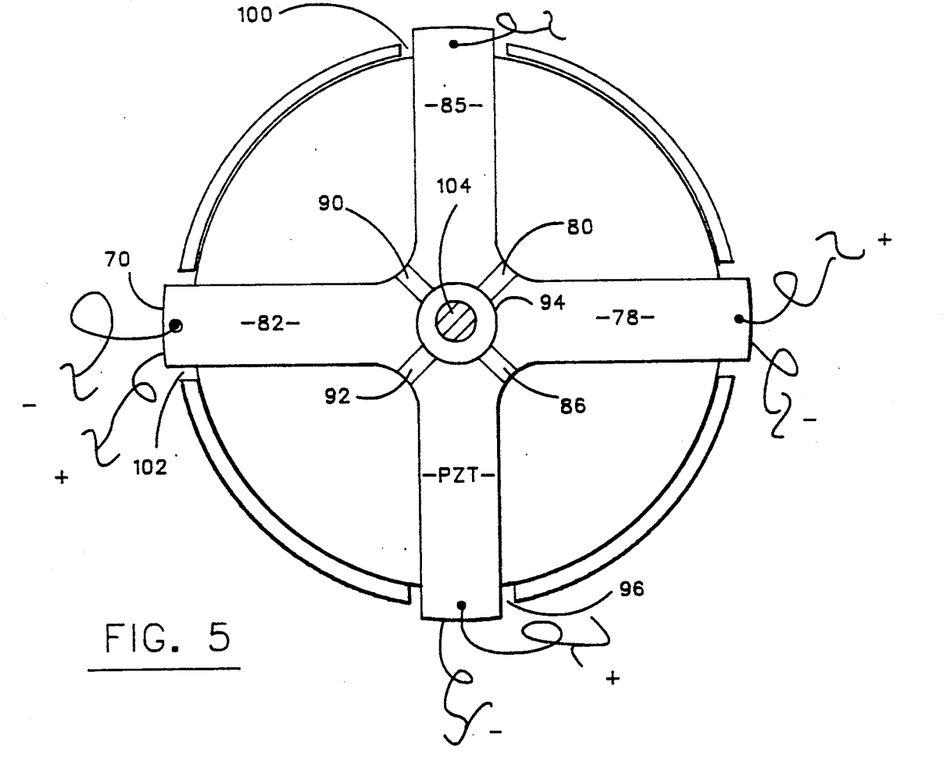
FIG. 5 is a sectional view taken on lines 5—5 of FIG. 4 of the alignment control apparatus with path length control.

FIG. 5 is a sectional view of FIG. 4 taken on section line 5—5. FIG. 5 shows the PZT alignment transducer 70 is shaped in the form of a cross that is metalized on the top and bottom surface of each of the four legs 76, 78, 80 and 82. Eight electrically isolated metalized area, such as regions 76, 78, 80 and 82 are established by etching away predetermined metalized regions 86, 88, 90, and 92 as shown. Electrical leads are connected to each of the metalized areas for connection to an electrical control and drive voltage source.

An alignment piezo 70 is a cross shaped four quadrant PZT transducer with four legs of equal length extending from a hub. The alignment piezo 70 has a top side 72 and a bottom side 74. The hub of the four-quadrant alignment PZT is bonded to the mirror post top end 64 and the extreme end of the bottom side 74 of each of the four legs 76, 78, 80, and 82 is bonded to the cylindrical wall rim 54.

The alignment piezo 70 is best characterized as a piezoelectric substrate that is polarized along it short thickness dimension and metalied on its top and bottom surface. The transducer is purchased as a disk with metalized surfaces. Th outline shape of the alignment piezo 70 is established by milling the disk into the configuration, such as the cross shape shown in FIG. 5. The metalization leading from the central hub of the cross to each of the legs is etched away in order to electrically isolate the metalization on each surface of each respective leg to form the cross pattern explained below in connection with FIG. 5. In operation, the length of a leg is extended with the application of a voltage of a first polarity and it is contracted with the application of a voltage of an alternate polarity.

The lower surface of the hub of the alingment piezo 70 is bonded to the mirror post top end 64 of mirror post 62. The transducer housing 84 has hole 94 and perimeter slots 96, 98, 100 and 102. Each leg of the four quadrant PZT alignment piezo 70 extends through a respective perimeter slot 96, 98, 100 and 102.

Figure 6:
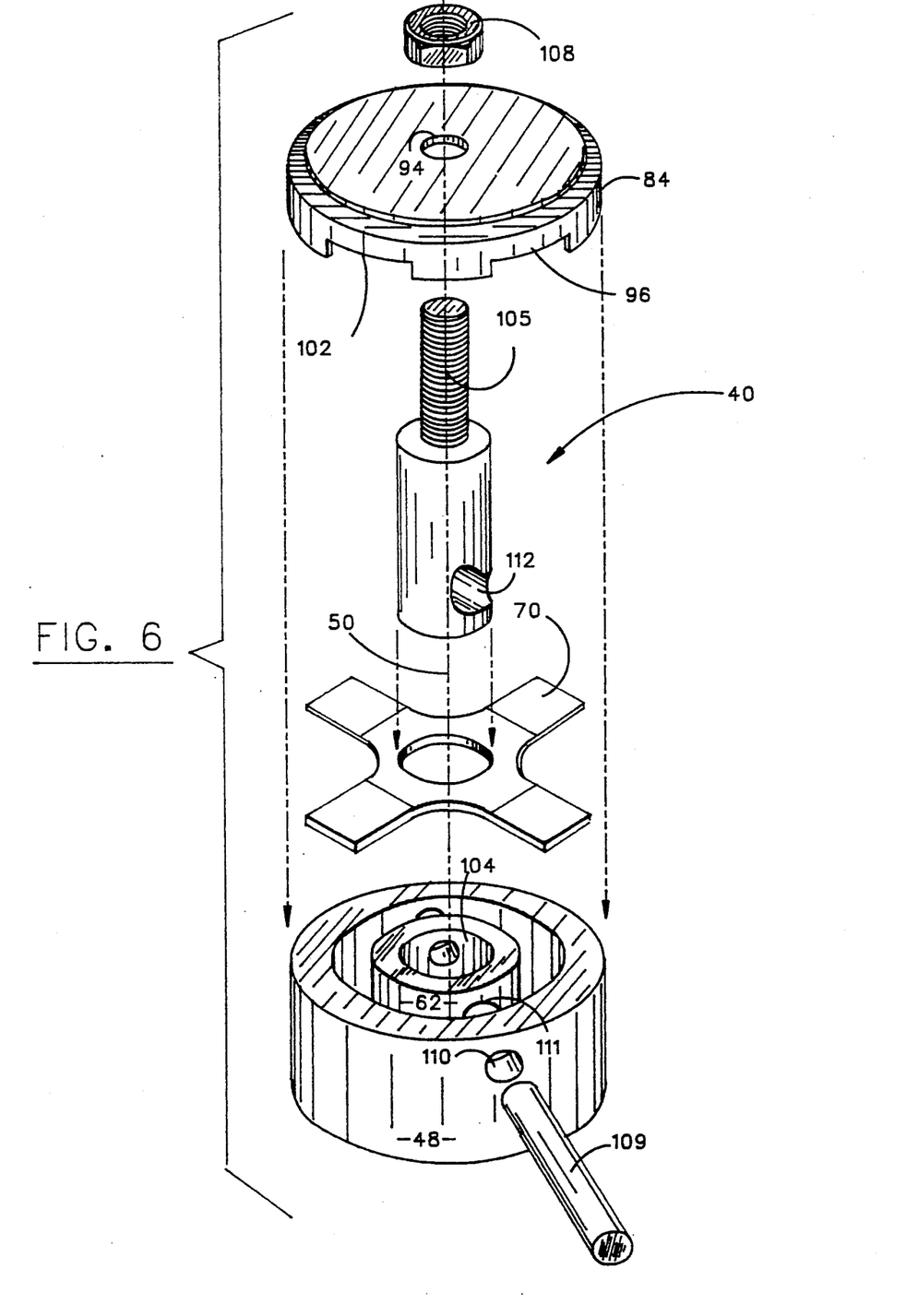
FIG. 6 is an exploded perspective view of the alignment control apparatus with path length control.

FIG. 6 is an exploded perspective view of the path length control apparatus 40 that shows the mirror post 62 has an axial hole 104 on central axis 50. Link rod 106 has a lower end inserted into axial hole 104 and a threaded end 105 that is passe through hole 94 in transducer housing 84. A pin 109 is inserted through a link pin access hole 110 in the cylindrical wall 48 into a mirror post locking hole 111 in mirror post 62. The link pin 109 passes through a rod locking hole 112 in the link rod 106 to lock the link rod 106 into axial hole 104 in the mirror post 62. A nut 108 is threaded onto the threaded end 105 to place the link rod 106 in tension and to preload the diaphragm comprised of the central region 58 and web 60.

Figure 7A:
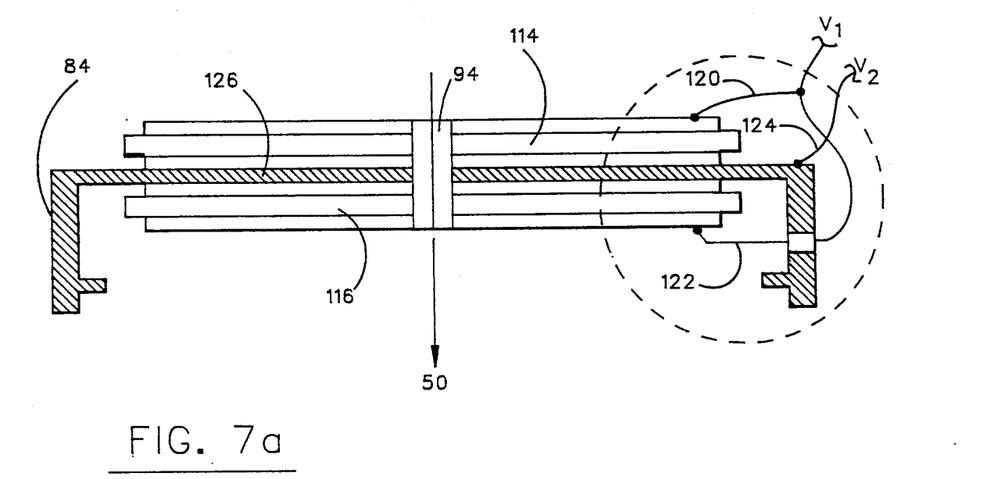
FIG. 7a is a sectional view of the transducer housing.
Figure 7B:
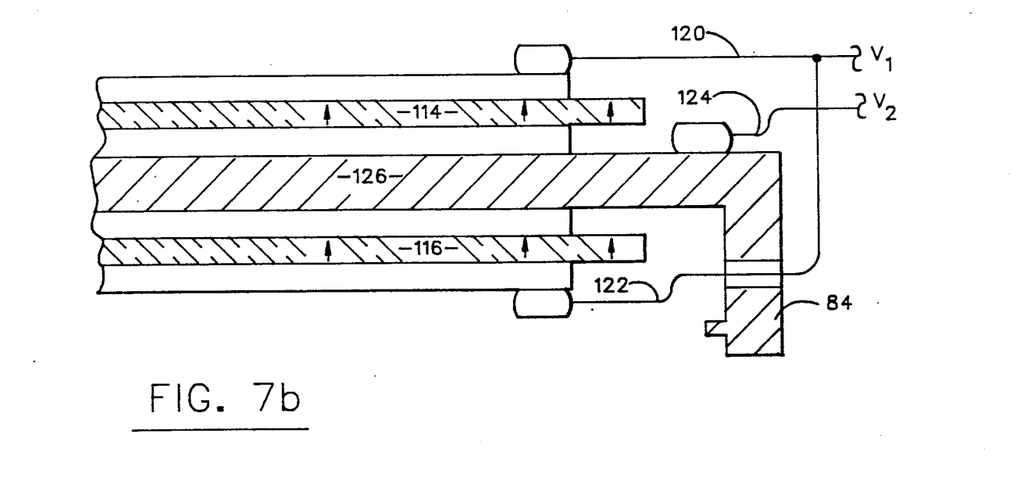

FIGS. 7a and 7b is a sectional view of FIG. 2 taken on line 7—7 of the transducer housing 84. The top and bottom displacement transducers (PZT) 114 and 116 are washer shaped PZT devices. Each displacement transducer has metalized surfaces on opposing sides. Connections are made to the PZT metalized surfaces to cause one PZT to expand, as the other is driven to contract. A top polarized signal lead 120 is connected to top metalized surface of the top displacement transducer 114. A bottom polarized signal lead 122 is connected to the bottom metalized surface of the bottom displacement transducer 116. A common signal lead 124 is connected to the bottom metalized surface of the top displacement transducer 114 and to the top metalized surface of the bottom displacement transducer 116 via a connection to the metal surface of the transducer housing 84.

The top and bottom displacement transducers, 114, 116 are ring shaped and are bonded to the inner surface and outer surface of the transducer housing end wall 126. Control signals are provided to the signal leads 120, 122 with respect to the common signal lead 124 to deflect the cap end wall 126 driving link rod 106 to deflect the central region 58 of base 44. The displacement transducers 114, 116 respond to a control signal of a first polarity, either positive or negative by deflecting transducer housing end wall 126 in a first direction to extend the central region in a first direction. The top and bottom displacement transducers 114, 116 respond to a control signal of a second polarity, which is negative when the first polarity is positive and is positive when the first polarity is negative, by retracting the central region 58. In a typical application, the control signals would be designed to operate within a range of + or −100 volts with respect to the neutral lead. A control system adjusts the signal amplitude as required to adjust the laser cavity to peak resonance.

Figure 8:
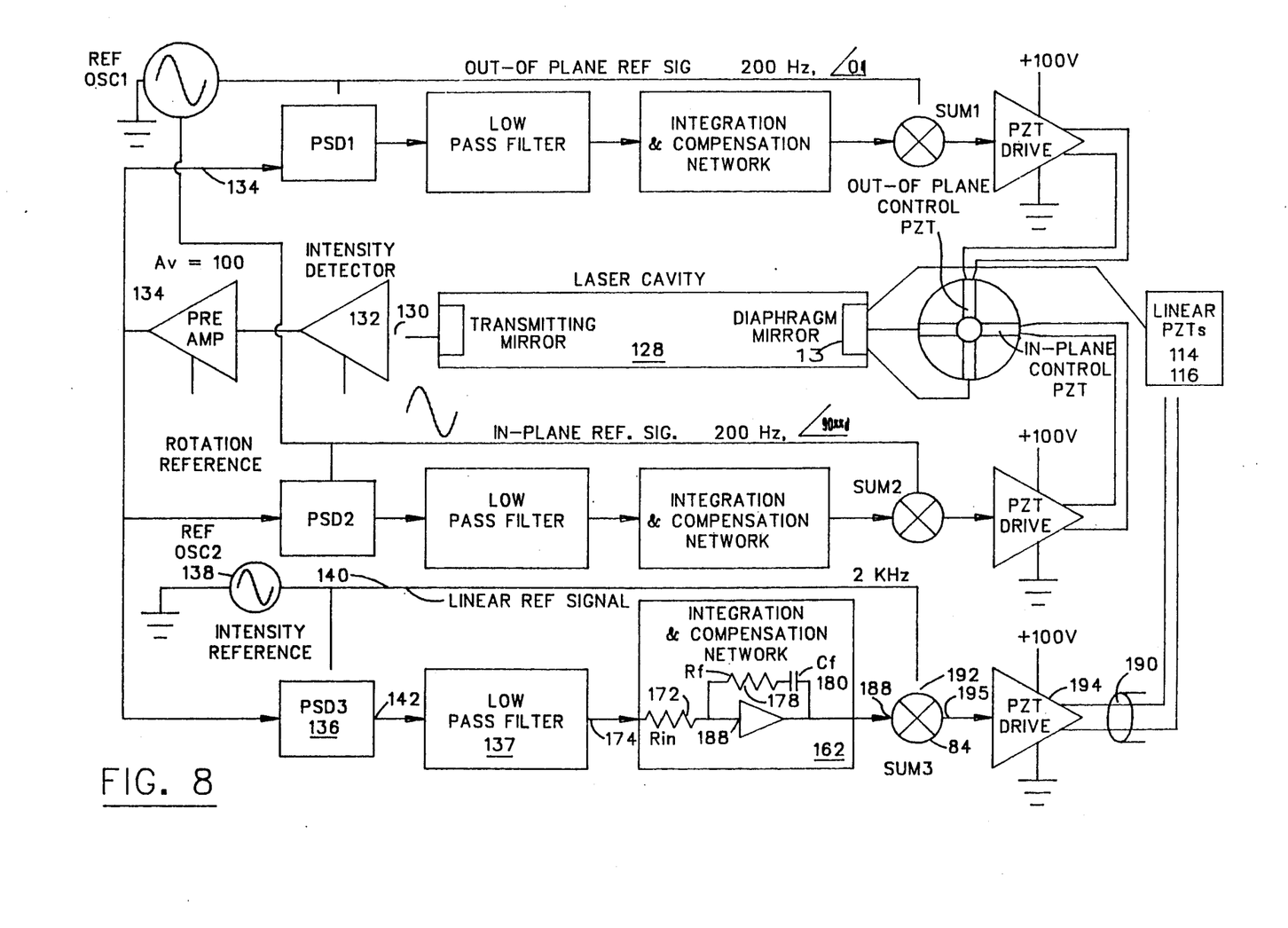
FIG. 8 is a block diagram of a typical control loop for in-plane and out-of-plane alignment and path length control.

FIG. 8 is a control system diagram for a typical control system to drive the alignment control piezo 70 and the top and bottom displacement transducers 40 to maintain the laser light 128 source at peak brilliance. The control system represents a control means for sampling coherent light from the light path via light path 130 and for providing a required control signals to the alignment control piezo 70 and the displacement transducer 114, 116 respectively to optimize the intensity of the beam while simultaneously adjusting the alignment and linear position of the diaphragm mirror 13.

The beam intensity in laser cavity 128 varies as a function of the amplitude of three modulation signals that are superimposed on the control signal applied to the displacement transducers. As shown in FIG. 8, oscillator REF OSC1 provides an out-of plane reference signal to summer 1 and to phase sensitive detector PSD 1 to control the top out-of plane lock-in amplifier channel. REF OSC1 also provides a in-plane reference signal to control the center channel in-plane lock-in amplifier channel. The in-plane reference signal has the same frequency as that of the out-of plane reference signal but it is shifted in phase with respect to the out-of plane reference signal by 90 degrees. The frequency of REF OSC1 is approximately 200 Hz.

Oscillator OSC2, 138 provides a third reference signal at approximately 2000 Hz to the lower path-length control lock-in amplifier channel for driving the linear path-length control (PLC) 40 to adjust the path length of the laser cavity 128. Operation of the in-plane and the out-of plane lock-in amplifier channels is similar to the path-length control lock-in amplifier channel. Light ray 130 leaves the laser cavity 128 via a transmissive mirror and impinges on intensity detector 132. Preamp 133 amplifies the intensity modulated signal with a gain of approximately 100.

The intensity detector 132 detects the low modulation signal in the light source on light ray 130 and provides a detected signal on signal path 134. The intensity pickoff 132 typically comprises a light sensitive diode and a matched preamp within a common integrated circuit that also contains circuit provisions for biasing the diode.

The modulated light source typically produces a modulation signal out of the light sensitive diodes within the intensity detector 132 in the range of 0.05–0.15 mVpp. The signal at the output of the preamp on output signal line 134 is typically in the range of 0.05–0.15 Vpp. The amplified modulation signal out of the pre-amp is fed to the signal inputs of three phase sensitive detectors on signal line 134. PSD1 and PSD2 receive the amplified modulation signal and detects the out-of plane and the in-plane error signals.

PSD3 136 receives the amplified modulation signal and detects the linear displacement error signal. Each of the three respective PSD devices represents a phase sensitive "synchronous" demodulator circuit, such as that shown in greater detail in FIG. 9. Each respective PSD circuit is referenced to a low frequency modulation signal, such as the 2 KHz reference signal from the reference oscillator OSC2 138 on signal line 140.

The output of the phase sensitive demodulator (PSD3) 136 is coupled to a low pass filter 137 by line 142. The filtered signal out of the low-pass filter 137 is then coupled to the integration and compensation network 162 to input resistor Rin, 172 by signal path 174. The integration is performed by a conventional integration circuit using a feed back resistor Rf, 178 and Cf, 180.

As shown in FIG. 8, the integrated linear displacement error signal is coupled to a first input 188 to SUM3. Each of the summers, such as SUM3, add a reference signal to the integrated error signal. The reference signal, such as the 2 KHz linear reference signal on signal line 140 is coupled to a second input 192 of SUM3 and is added to the integrated linear displacement error signal. The composite linear displacement signal from SUM3 84 is coupled via signal line 195 to the input of high voltage PZT drive amplifier 194. The PZT drive amplifier scales and buffers the resulting composite error signal for application to the LINEAR PZTs 114, 116. from output PZT drive terminal 190.

Figure 9:
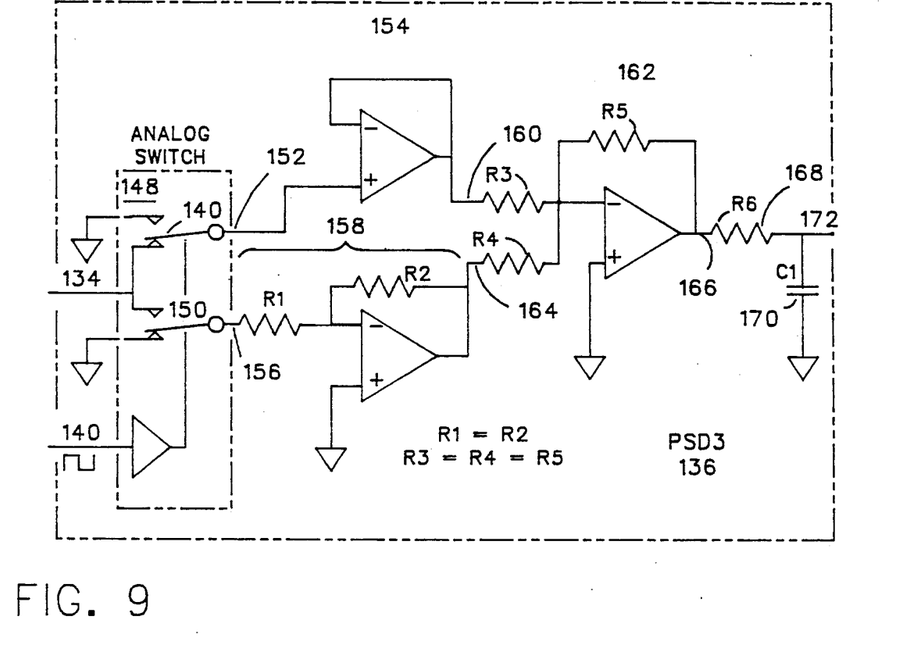
FIG. 9 is a schematic of a phase sensitive demodulator circuit.

FIG. 9 is a schematic of a typical embodiment of a PSD circuit. Analog switch 148 contains a first synchronized switch 149 and a second synchronized switch 150. The first and second synchronized switches 149, 150 alternately transfer the non-inverting input 152 of voltage follower 154 and the inverting input 156 of inverting amplifier 158 between ground and the signal from the intensity pickoff on signal line 134. The non-inverting input and the inverting inputs are transferred on alternate phase intervals of the reference signal on reference oscillator signal line 140. Thus, the non-inverting input 152 and the inverting input 156 are grounded on alternate half cycle intervals of the reference signal.

The first inpout 160 to summer 162 in FIG. 9 receives the output signal from the non-inverting amplifier 154 and the second input 164 of the summer 162 receives the output of the inverting amplifier 158. The sum of the two signals are provided at the summer output terminal 166.

If the input signal on signal line 134 is in phase with reference signal on signal line 140, a full wave rectified signal of a first polarity will be present at summer output terminal 166. If the signal on signal line 134 is exactly out of phase with the reference signal on signal line 140, a full wave rectified signal of an opposite polarity will be present at the summer output terminal 166. The low pass filter formed by R6, 168 and C1, 170 filter a substantial amount of ripple out of the signal present at the PSD output terminal 172. The function of low pass filter 137 in FIG. 8 can be formed by a low pass filter such as the R6, C1 filter network of FIG. 9.

The gain of a PSD is typically 2/pi. The gain of a PSD, such as PSD3 136 is obtained by considering the result of driving the input of a PSD circuit with an input signal that is of the form Sin(Theta). If the input signal is in phase with the reference, the output signal is that of a full wave rectifier. The average value of a full wave rectified waveform is equal to 2/pi which is obtained by integrating Sin(Theta)d(Theta) from 0 to pi and then dividing the result by pi. The angle pi is the interval over the independent variable "Theta" for which the function was integrated. The average value thus obtained is 2/pi.

The filter comprised of R6, 168 and C1, 170 on the output of the PSD adds another pole to the open loop gain characteristic of the control loop. The filter is designed to remove high frequency components of signal noise and therefore only introduces a small amount of phase shift in the low frequency range of interest.

Figure 10:
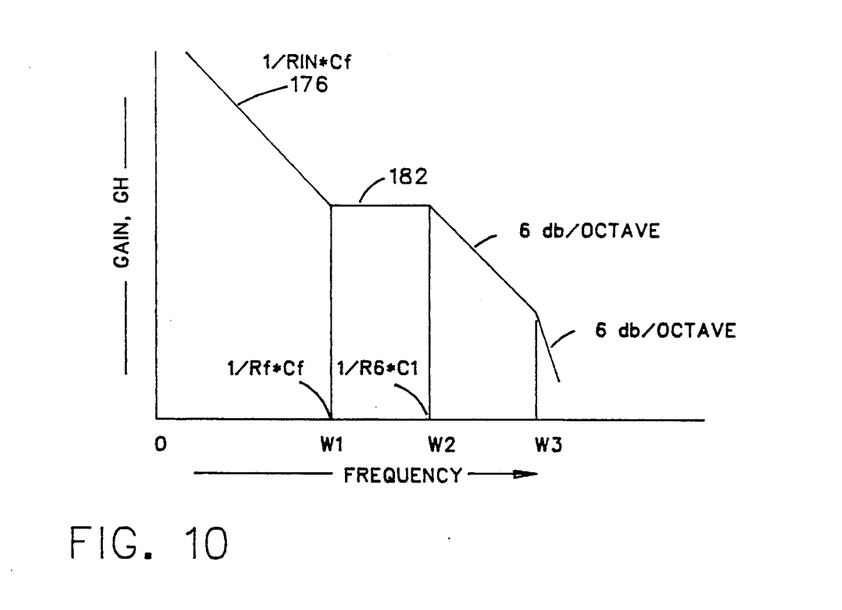
FIG. 10 is bode plot of the open loop response of a typical path length control loop.

FIG. 10 shows a straight line approximation of the log-log gain versus frequency response of the open loop characteristic of the control loop of FIG. 8. The slope of the first curve associated with reference number 176 is 1/(Rin*Cf). A zero is introduced at a first break frequency at w1 which occurs at a frequency of 1/(Rf*Cf). The zero is introduced by the presence of feedback resistor Rf, 178 in series with feedback capacitor Cf, 180. The slope of the second curve 182 is zero db per octave over the frequency range from w1 to w2.

Referring again to FIG. 8, out-of plane and in-plane error signals are provided at the outputs of PSD1 and PSD2 respectively. Each signal is low pass filtered and processed by an integration and compensation network to provide respective integrated out-of phase and integrated in-phase error signals to the first inputs of SUM1 and SUM2 respectively. Operation of the SUM1 and SUM2 amplifier is similar to the operation of PZT3. The output signals from the SUM1 and SUM2 amplifiers is delivered to the inputs of an out-of plane PZT DRIVE and an in-phase PZT DRIVE respectively. Out-of plane drive signal and in-plane drive signals are provided to the out-of plane control PZT and the in-plane control PZT in the alignment transducer 70 to tilt the diaphragm mirror 13 with respect to the central axis to peak the intensity output signal.

Eight signal leads from the alignment transducer 70 are driven by out-of plane and in-plane high voltage amplifiers respectively. A prototype alignment transducer test unit was tested with a piezo electric element obtained from the EDO WESTERN Company of Salt Lake City, Utah and the angular sensitivity was measured to be approximately 0.1 arc seconds per volt. The usable range of control was estimated to be + or −10 arc seconds on each of two axes for the unit tested. The alignment transducer and the displacement transducers were installed with type 825 Epoxy from ABLESTICK LAB in Gardena, Calif. using a Versamid 140 hardener. The PZT devices were all approximately 0.020 inches in thickness. The metal thickness of the top of the cap end wall 126 that was used was approximately 0.020 inches.

Figure 11:
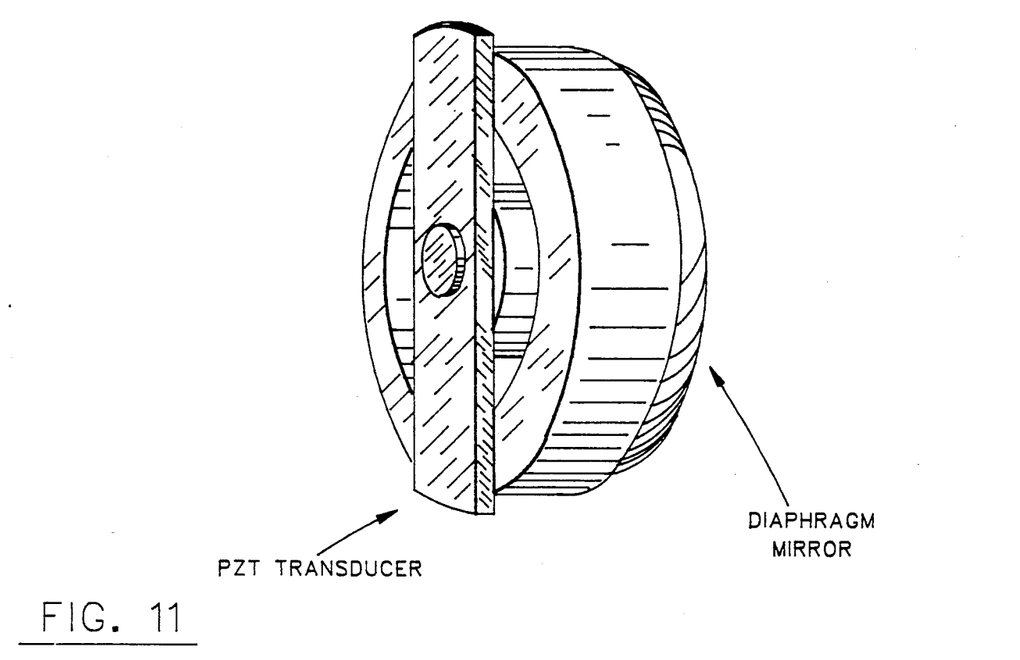
FIG. 11 is a perspective view of a single axis alignment transducer.
Figure 12:
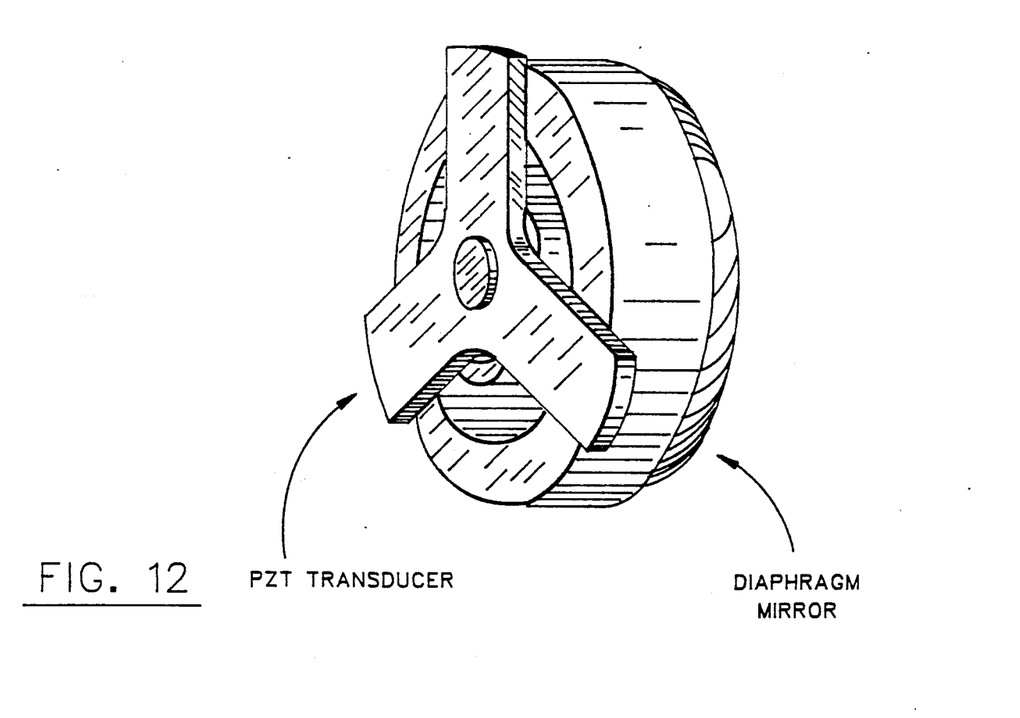
FIG. 12 is a perspective view of a triple axis alignment transducer.

FIG. 11 shows an alternative embodiment of an alignment transducer 70 with only one axis of tilt or rotation control. FIG. 12 is an alternative embodiment of an alignment transducer with a tilt control on three pivot axes. Each of the legs on the respective PZT elements used for the control of these two alternative embodiments would be metalized on both sides and driven in the same manner as the alignment transducer 70 is driven.

Although the invention interferometer alignment control apparatus 40 has been disclosed and illustrated in detail, it is to be understood that the same is by way of illustration, and as an example only, and is not to be taken by way of limitation. The spirit and scope of the invention is to be limited only by the terms of the appended claims.

What is claimed is:
1. An alignment control apparatus comprising:
 a mirror housing having a wall, a base, said wall having an inner wall and an outer wall, the base having an inner surface and an external surface, the base having a central region integrally and flexibly coupled to the mirror housing inner wall, the base having a mirrored surface on the base external surface;
 means for rotating the central region in response to a first alignment control signal on at least one rotational axis.

2. The alignment control apparatus of claim 1 wherein the inner wall is joined to the base central region at a base end by a flexible web, the wall extending above the base inner surface and terminating at a rim defining an aperture;
 a post extending from the central region of the base inner surface within the wall to a post top end;
 an alignment transducer means responsive to the first alignment control signal for applying at least a first force between the post and the wall to change the angle between the base inner surface and the inner wall.

3. An alignment control apparatus comprising:
 a mirror housing having a mirror housing inner wall and a base, said base having a central region integrally and flexibly coupled to the mirror housing inner wall;
 means for rotating the central region in response to a first control signal on at least one rotational axis; and,
 means for simultaneously displacing the central region along a longitudinal axis in response to a second control signal.

4. The alignment control apparatus of claim 3 wherein the inner wall is joined to the base central region at a base end by a flexible web, the wall extending above the base inner surface and terminating at a rim defining an aperture, and;
 a post extending from the central region of the base inner surface within the wall to a post top end; and wherein the means for rotating the central region has an alignment transducer means responsive to a first alignment control signal for applying at least a first force between the post and the wall to deflect the mirror.

5. An alignment and path length control apparatus comprising:
  a mirror housing having a base and a closed wall having a central axis,
  the base having a mirrored external surface,
  the wall having a central axis,
  the wall being joined to the base at a base end by a flexible web, the wall extending above the base and terminating at a rim defining an aperture, the base having a central region flexibly coupled to the closed wall;
  a post extending from the central region of the base within the closed wall to a top end;
  a mirror axis extending normal to the mirrored external surface through the post;
  an alignment transducer means responsive to a first alignment control signal for applying at least a first force between the post and the wall to deflect the mirror axis with respect to the central axis; and
  a linear transducer means responsive to a linear displacement control signal for applying an axial force to the post with respect to the rim to displace the central region longitudinally along the central axis.

6. The alignment and path length control apparatus of claim 5 wherein the base is circular in shape and the closed wall is cylindrical in shape.

7. The alignment and path length control apparatus of claim 5 wherein the base mirrored surface is substantially flat.

8. The alignment and path length control apparatus of claim 5 wherein the base is integrally joined to the cylindrical wall at the base end.

9. The alignment and path length control apparatus of claim 8 wherein the base and the cylindrical wall are formed of homogeneous material.

10. The alignment and path length control apparatus of claim 5 wherein the post further comprises:
  a top bore extending into the post from the top end, the bore being positioned to be substantially coaxial with the mirror axis normal to the mirrored surface, the bore extending to a predetermined depth in the post.

11. An alignment and path length control apparatus comprising:
  a mirror housing having a circular base and a closed cylindrical wall with a central axis;
    the base having a substantially flat mirrored external surface;
    the base being integrally joined to the wall at the base end by a flexible web, the base and the wall being formed of homogeneous material;
    the wall extending above the base and terminating at a rim defining an aperture; and
    the base having a central region flexibly coupled to the closed wall;
  a post extending from the central region of the base within the closed wall to a top end, a mirror axis extending normal to the mirrored external surface through the post, the post further comprising a top bore extending into the post from the top end, the bore being positioned to be substantially coaxial with the mirror axis normal to the flat mirrored surface, the bore extending to a predetermined depth in the post;
  an alignment transducer means responsive to a first alignment control signal for applying at least a first force between the post and the wall to deflect the mirror axis with respect to the central axis; and
  a linear transducer means responsive to a linear displacement control signal for applying an axial force to the post with resepct to the rim to displace the central region longitudinally along the central axis, the linear transducer means further comprising:
    a deflection plate coupled to the cylindrical wall rim;
    a pin having a first end inserted into the central post bore and a second end coupled to the deflection plate;
    a means for preloading the pin; and
    a deflection means responsive to the linear displacement control signal for bending the deflection plate to move the pin along the mirror axis.

12. The alignment and path length control apparatus of claim 11 wherein the deflection plate has a top and a bottom surface and wherein the deflection means further comprises:
  a top PZT device and a bottom PZT device, each respective PZT device being coupled to be responsive to the linear displacement control signal.

13. An alignment and path length control apparatus comprising:
  a mirror housing having
  a base, the base having a flat mirrored external surface,
  a cylindrical wall having a central axis,
  the cylindrical wall being integrally joined to the base at a base end, the cylindrical wall extending above the base and terminating at a rim defining an aperture, the base having a flexible region coupling a central region of the base to the base end of the cylindrical wall;
  a post extending from the central region of the base within the cylindrical wall to a height substantially equal to the height of the rim; a mirror axis extending normally from the flat mirrored external surface through the post; the central axis of the cylindrical wall being substantially parallel with the normal axis of the mirrored surface;
  an alignment transducer means responsive to a first alignment control signal for applying at least a first force between the post and the wall to deflect the normal axis of the post with respect to the central axis of the cylindrical wall;
  a linear transducer means responsive to a linear displacement tcontrol signal for applying an axial force to the post with respect to the rim to displace the central region of the base longitudinally along the central axis.

14. An alignment and path length control process comprising the steps of:
  positioning a flat mirror formed on a central region of a mirror housing to reflect the light within a laser cavity, the central region being flexibly coupled to a cylindrical wall extending to a rim;
  extending a post from the central region of the base within the cilindrical wall to a height substantially equal to the height of the rim;
  applying at least a first force in response to an alignment control signal between the post and the cylindrical wall to deflect the post with respect to the cylindrical wall to adjust the angle of incidence of the laser beam on the mirror surface; and concurrently applying an axial force to the post in response to a linear displacement control signal to move the post longitudinally with respect to the cylindrical wall to adjust the longitudinal position of the mirror surface to tune the laser cavity.

15. An alignment control system, for peaking the intensity of light in a resonant cavity having a source of coherent light, comprising:

a mirror housing having a mirror housing inner wall and a base, said base having a central region integrally and flexibly coupled to the mirror housing inner wall;

oscillator means for providing at least a first reference signal;

intensity detector means responsive to the source of coherent light for providing a signal proportional to the intensity of coherent light;

means for rotating the central region in response to a first control signal on at least one rotational axis and responsive to the reference signal for modulating the rotation of the central region in synchronization with the reference signal;

phase sensitive detector and lock-in amplifier means responsive to the intensity detector signal for providing a first control signal to peak the intensity of the laser light source; and, means for simultaneously displacing the central region along a longitudinal axis in response to a second control signal.

16. The alignment control system of claim 15 wherein the inner wall is joined to the base central region at a base end by a flexible web, the wall extending above the base inner surface and terminating at a rim defining an aperture, and;

a post extending from the central region of the base inner surface within the cylindrical wall to a post top end; and wherein the means for rotating the central region has an alignment transducer means responsive to a first alignment control signal for applying at least a first force between the post and the wall to deflect the mirror.

* * * * *